Nov. 19, 1968  W. M. HERPICH  3,411,555
DRIVER FOR SCREW
Filed July 22, 1966

INVENTOR
WILLIAM M. HERPICH

BY
Mason, Porter, Diller & Brown
ATTORNEYS

United States Patent Office 3,411,555
Patented Nov. 19, 1968

3,411,555
DRIVER FOR SCREW
William M. Herpich, Litchfield, Conn., assignor to The Torrington Company, Torrington, Conn., a corporation of Maine
Filed July 22, 1966, Ser. No. 567,236
10 Claims. (Cl. 145—50)

ABSTRACT OF THE DISCLOSURE

There is disclosed a driver for a screw, the driver having a shank portion and a head portion terminating in an annular ring portion, the head portion also having a recess in an end thereof, a centrally positioned protruding portion inwardly of the recess, a plurality of ribs defined by side walls extending radially from the protruding portion to an interior of the ring portion, said ribs having end surfaces which slope away from the central protruding portion toward the ring portion and also slope transversely of the thickness of the ribs.

---

This application relates in general to new and useful improvements in the driving tool art, and more particularly relates to screw drivers for screws which are adapted to be driven by power tools.

Accordingly, it is the primary object of this invention to provide a novel screw driver having radially outwardly extending ribs adapted to engage corresponding slots in the head of a screw, the ribs having end surfaces and extending outwardly from a central axis of the screw driver to define a segmentally concaved contour, and which ribs also slope transversely of their thickness, in order to permit high torque transmission from the driving tool to the screw shank.

It is another object of this invention to provide a novel screw driver, capable of high torque transmission, which is adapted to be self-centering with respect to a driven screw, and which is capable of driving a screw when the axis of the driver and the axis of the screw are not aligned.

It is still another object of this invention to provide a novel screw driving tool having angularly disposed driving surfaces on a driving blade, which surfaces are adapted to be inserted into corresponding slots in a screw head and to provide a greater area between the driving blade and screw head for the transmission of torque therethrough in the direction of screw drive than in the reverse direction.

With the above and other objects in view that will hereinafter appear, the nature of the invention will be more clearly understood by reference to the following detailed description, the appended claims and the several views illustrated in the accompanying drawings.

Figure 1:
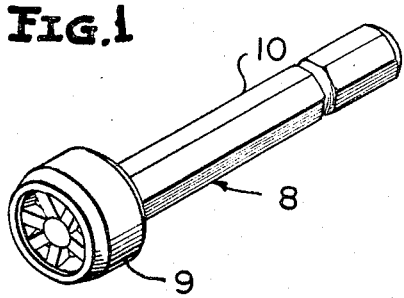
FIGURE 1 is a longitudinal perspective view of a screw driver of this invention at one end thereof, the shank of the driving element being of a type adaptable for use in a power-operated tool.

Referring now to the drawings in detail, reference is first made to FIGURE 1 wherein there is illustrated a coupling and driving element 8 of this invention having a driving head portion 9 and a shank portion 10. The shank portion 10 may have any desired configuration such as the conventional hex-shaped configuration illustrated in FIGURE 1, and is adapted for insertion into the chuck of a power operated tool. The head portion 9 is of integral construction with the shank 10 and is made by a casting or other suitable process as is desired.

The head portion 9 is enlarged diametrically as compared with the shank 10 and comprises a thickened base portion 11 and a ring portion 12. A centrally positioned transverse planar portion 13 defines a terminal end of the shank 10, recessed inwardly of the ring 12 of the head portion 9. A plurality of ribs 14 extend radially outwardly from the planar portion 13 to an inside surface 15 of the ring portion 12 of the head portion 9.

Each of the ribs 14 includes opposed parallel sidewalls 16, 17 and an end surface 18. Each rib end surface 18 is sloped away from a central axis of the screw driver 8, in such a manner as to define an acute angle between a line on each end surface 18 intersecting a central axis of the screw driver 8 and the central axis of the screw driver 8 extended outwardly beyond the planar portion 13.

Figure 2:
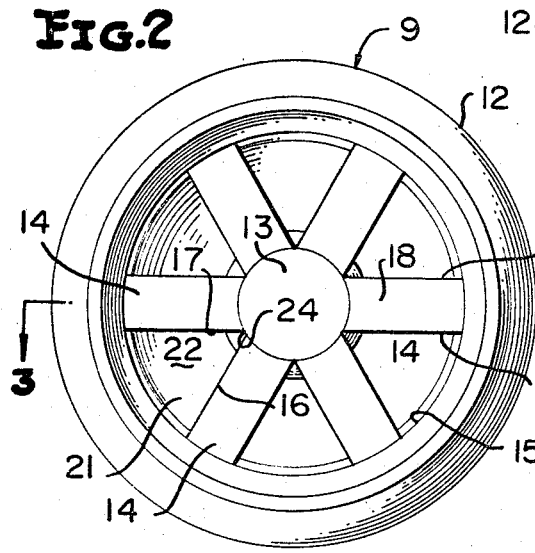
FIGURE 2 is an enlarged end view of a driving end portion of a screw driver of this invention and illustrates the radially extending ribs and outer ring comprising the enlarged driving head of this invention.
Figure 3:
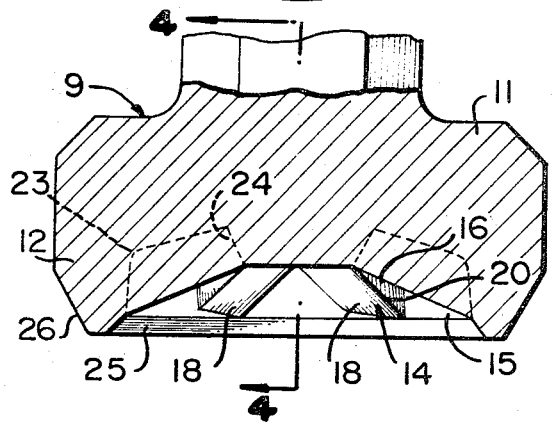
FIGURE 3 is an enlarged fragmentary sectional view taken along the line 3—3 of FIGURE 2 and illustrates the concavity of the enlarged head of the screw driving element, which assures against misalignment between the screw driver and a driven element.
Figure 4:
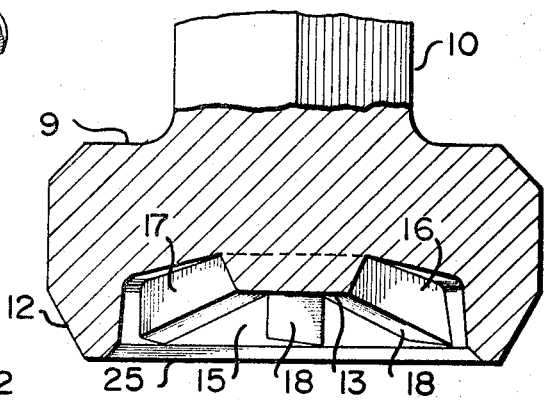
FIGURE 4 is an enlarged fragmentary sectional view of the screw driver of this invention taken along the line 4—4 of FIGURE 3 and illustrates the angular disposition of the end surfaces of the radially disposed ribs of the driving blade of this invention.

In the illustrations of FIGURES 2 through 4 of the drawings, there are shown six ribs 14, equidistantly angularly spaced about the planar portion 13. The surfaces 18 of the ribs 14 cooperate with the planar portion 13 to define therewith a segmentally contoured concave surface inwardly of the ring portion 12 of the head portion 9.

Each of the ribs 14 also slopes transversely of its thickness, between walls 16 and 17, with surfaces 16 and 18 intersecting in an acute angular relationship along their mating edge 20. Edge 20 thus becomes the leading edge and surface 16 consequently becomes the driving surface upon normal clockwise rotation of the tool 8. It is thus readily seen that a greater area will be presented by surface 16 to a corresponding mating surface of a driven member than is the area presented by the surface 17, which becomes a driving surface only upon removal of the driven member by counterclockwise rotation of the tool 8.

Each angular volume 21 defined between adjacent ribs 14 and inner surface 15 of the ring 12 is of less depth inwardly adjacent the protrusion which terminates in planar portion 13 than its depth adjacent inner surface 15 of the ring portion 12. Each volume 21 has an innermost surface 22 which terminates in an arcuate merging portion 23 with the surface 15 of ring portion 12. The sidewalls of the volume 22, being defined by surfaces 16, 17 of adjacent ribs 14 merge in line 24 which extends inwardly from an outer circumferential edge of planar portion 13. The increased depth of each of the volumes 22 at the radial outermost portion of each of the volumes 22 facilitates the abutment of a greater driving surface at the radial outermost portion of the head of a driven screw member thus facilitating the transmission of a greatest amount of torque to the screw member.

The end of the ring portion 12 of the head portion 9 is chamfered at 25 adjacent the inner ring surface 15, in order to facilitate insertion of screw head portions into the volumes 22 and to define a greater concave surface area with surfaces 18 and 13, thereby even further facilitating the application of the recessed head portion 9 of the tool 8 to a driven screw member. The ring portion 12 may also be chamfered at 26, on its outer surface thereof, in order to provide clearance during use and operation of the tool 8.

Figure 5:
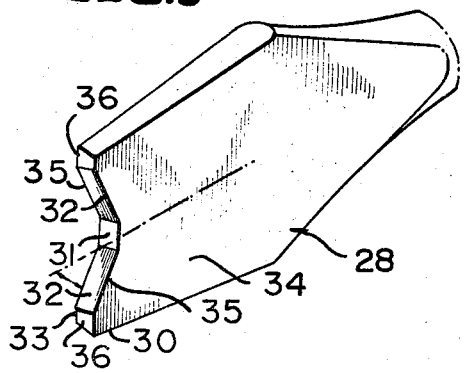
FIGURE 5 is a partial perspective view of an alternative screw driver of this invention, having only a pair of angularly disposed concave rib portions at the end of the driving blade.
Figure 6:
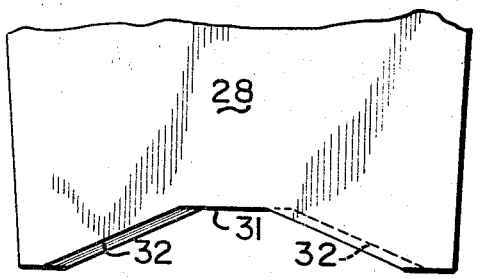
FIGURE 6 is an enlarged fragmentary elevational view of one side of the driving blade illustrated in FIGURE 5, wherein there is illustrated the angular disposition of the end surfaces of the driving ribs of this embodiment of the invention.

Referring now to FIGURE 5 of the drawings, there is illustrated an alternative driving end portion 28 of this invention. The driving end 28 is of the blade type and has a terminal end 30 thereof cut in dovetail fashion to define a centrally disposed transverse planar portion 31 and a pair of angularly disposed surface portions 32 on opposite sides of planar surface portion 31.

Planar portions 32 are each disposed at an angle with a central axis of the blade portion 28 and surface portions 32 cooperate with planar surface portion 31 to define a generally concave recess in the end 30 of the blade portion 28.

Each of the surfaces 32 slopes transversely of the thickness of the blade portion 28 between opposite sides 33, 34 thereof, defining acute angles at the junction of surfaces 32 with one of the respective side portions 33, 34 terminating in leading edges 35. The edges 35 are adapted to be inserted most deeply into a corresponding slot in a mating screw element, when the blade portion 28 is rotated in a clockwise direction while driving such a screw element. Thus, that side of the blade portion 28 which applies a driving force has a greater contact area with an associated area of a screw element, during driving of the screw element than those areas of the blade sides and head of the screw element which are in contact during removal of a screw element. Additionally, the blade portion 28 may terminate in transverse planar portions 36, disposed adjacent the outermost ends of planar portion 32.

It is to be understood, that, while the driving tools of this invention have been specifically disclosed as being adapted to be power driven, they are also adapted to be hand operated, wherein the shank of such a tool would be provided with a conventional screw-driving handle.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A coupling and driving device comprising a shank portion and a substantially concave end portion; said end portion comprising a centrally positioned planar portion disposed transversely of a longitudinal axis of said shank portion; a plurality of ribs extending radially outwardly from the planar portion of said end portion; each said rib having parallel side walls and a flat end surface with said end surface extending in the direction of the opening out of said concave end portion as an outwardly and endwise sloping planar surface which intersects said central planar portion so that the ribs collectively define therewith a segmentally contoured concave surface for said end portion; each said outwardly and endwise sloping planar surface also sloping transversely of the respective rib to intersect one of the respective rib side walls at an acute angle thereby to provide said one side wall with a pressure applying surface of greater area than the other side wall of said rib.

2. A device as set forth in claim 1 wherein there are two of said ribs which cooperate with said central planar portion to define a dovetail driving end.

3. A device as set forth in claim 1 wherein said ribs terminate radially outwardly in an enlarged head portion.

4. A device as set forth in claim 3 wherein triangular volumes are defined between adjacent radial ribs and a bottom of a cutaway portion between said adjacent ribs.

5. A device as set forth in claim 4 wherein there are six ribs equidistantly spaced about said end portion.

6. A device as set forth in claim 3 wherein said enlarged head extends longitudinally beyond the radial outermost portions of said ribs and is chamfered inwardly thereof.

7. The device as set forth in claim 4 wherein the depth of said triangular volumes increases radially outwardly of said volumes.

8. The device as set forth in claim 3 wherein said end portion is made of cast metal and all components are integral therewith.

9. A driver for a screw comprising a shank portion and a head portion; said head portion having a recess in an end thereof; a centrally positioned protruding portion inwardly of said recess; said head portion terminating in an annular ring portion; a plurality of ribs each defined in part by side walls and extending radially from said protruding portion to an interior of said ring portion; each said rib also having an end surface which slopes away from said protruding portion toward said ring portion and transversely of the thickness of each rib between its side walls thereby to provide a pressure surface of greater area at one side wall of each rib than at its other side wall.

10. The driver of claim 9 wherein inner and outer chamfers are provided at the recessed end of the head portion.

References Cited

UNITED STATES PATENTS

| 2,015,878 | 10/1935 | Trotter | 85—45 |
| 2,954,719 | 10/1960 | Vaughn | 85—45 |
| 3,178,988 | 4/1965 | Borup | 85—45 |

FOREIGN PATENTS

| 432,406 | 10/1911 | France. |
| 871,232 | 4/1953 | Germany. |
| 201,705 | 3/1939 | Switzerland. |

ROBERT C. RIORDON, *Primary Examiner.*

R. V. PARKER, *Assistant Examiner.*